Oct. 17, 1967 S. B. AKERS, JR., ET AL 3,348,197

SELF-REPAIRING DIGITAL COMPUTER CIRCUITRY EMPLOYING ADAPTIVE TECHNIQUES

Filed April 9, 1964 3 Sheets-Sheet 1

INVENTORS:
SHELDON B. AKERS, JR.
GEORGE H. CODDINGTON,

BY Marvin L. Goldenberg

THEIR ATTORNEY.

INVENTORS
SHELDON B. AKERS, JR.
GEORGE H. CODDINGTON,
BY Marvin R. Goldenberg
THEIR ATTORNEY.

INVENTORS:
SHELDON B. AKERS, JR.
GEORGE H. CODDINGTON,
BY Marvin L. Goldenberg
THEIR ATTORNEY.

United States Patent Office 3,348,197

Patented Oct. 17, 1967

3,348,197

SELF-REPAIRING DIGITAL COMPUTER CIRCUITRY EMPLOYING ADAPTIVE TECHNIQUES

Sheldon B. Akers, Jr., Syracuse, and George H. Coddington, Brewerton, N.Y., assignors to General Electric Company, a corporation of New York Filed Apr. 9, 1964, Ser. No. 358,456
7 Claims. (Cl. 340—146.1)

ABSTRACT OF THE DISCLOSURE

Logic performing circuitry of digital type in which adaptive techniques are combined with redundancy to provide a self-repair characteristic for extending the operation of the circuit in the presence of random failures of its component parts. A plurality of three or more logic units each having an adaptive property and each performing the same logic operation are operated in parallel through an output majority gate, the majority output being fed back to each logic unit. Each unit has one or more sets of standby component parts and in the presence of failure of an operating part, and in response to the majority output, the failed part is replaced by a standby part.

The present invention relates to digital computer circuitry and to novel circuitry of this type which is self-repairing. More particularly, the circuitry employs adaptive or learning techniques in combination with redundancy for extending its operation in the presence of normal failure of various component parts.

Computer equipments, whether of a simple or complex nature, are useful devices only so long as each component part thereof is operating properly. Failure of any single element may result in erroneous computations and will reduce equipment reliability. Computer circuitry is necessarily composed of a large number of component parts so that retaining the utility of the equipment and insuring each component part be properly operating is oftentimes a considerable and difficult task. Other than optimizing the reliability of each component part, the conventional approach to this problem is to provide a multiplication of the various parts of the equipment that are subject to failure, using the principle of redundancy whereby a plurality of identical circuit components are operated in parallel and the majority response of said circuit components is employed to provide the final output. Thus, the failure of a single component part, or plural parts if the order of redundancy is high enough, will not effect the overall operation of circuitry since additional component parts are available to assume the burden of operation. The obvious disadvantage of redundancy techniques is that the multiplication of component parts required for a given computer operation adds to the expense and complexity of the equipment and also to the total power consumption. Consistent with avoiding peacemeal breakdowns in the equipment is to increase the order of redundancy so that the greater the multiplication of component parts, the longer the period of continuous operation. Of course, the greater the multiplication and order of redundancy, the greater the complexity and expense of the equipment and the power requirements.

It is obvious from the above discussion that great advantage would be gained from circuitry which was to extend the time of continuous operation without the necessity for excessive multiplication of component parts and parallel operation thereof. The present invention is of this type. As compared to conventional redundancy circuitry of comparable performance characteristics, the invention provides a capability for appreciably reducing the number of multiple logic performing component parts required for a given logical or computer operation and, in addition, further reduces the number of such component parts required to be in constant operation.

It is accordingly an object of the present invention to apply adaptive and redundancy techniques to digital computer circuitry so that said circuitry acquires a self-repairing characteristic.

It is another object of the invention to apply adaptive and redundancy techniques to digital computer circuitry so that said circuitry acquires a self-repairing characteristic whereby its continuous operation can be extended in a relatively efficient manner.

It is a further object of the invention to apply adaptive and redundancy techniques to digital computer circuitry so as to provide extended continuous operation thereof in the presence of random failures of logic performing component parts with a substantial reduction in the required multiplication and parallel operation of said component parts as compared to conventional redundancy circuitry of comparable performance characteristics.

It is another object of the invention to provide novel digital computer circuitry exhibiting extended continuous operation in the presence of random failures of its logic performing component parts wherein a substantial reduction is made in the required multiplication and parallel operation of identical component parts as compared to conventional redundancy circuitry of comparable performance characteristics.

It is a further object of the invention to provide novel digital computer circuitry exhibiting extended continuous operation in the presence of random failures of its logic performing component parts which requires appreciably less multiple component part operation and therefore less power consumption and component wear than comparably performing computer circuitry of conventional type.

It is a still further object of the invention to provide a novel digital computer component of the above noted advantageous circuit characteristics that is operable as a variable input AND gate.

It is yet another object of the invention to provide novel digital logical circuitry of the above noted advantageous circuit characteristics that is operable as a binary pattern detector.

These and other objects of the invention are accomplished in a novel digital computer circuitry in which there are combined redundancy techniques with self-adapting or learning techniques. By "self-adapting or learning" is meant the ability of the circuitry to automatically rearrange itself and modify its interconnections and operation in response to external stimuli and in accordance with a set of established logical rules so as to correctly perform a given logical operation. Self-adapting techniques of this type are known in the prior art and an example thereof may be found in an article appearing in Space/Aeronautics, December 1962, entitled "Bipad Learns Arbitrary Switching Functions," by S. B. Akers.

In effect, two levels of redundancy are employed. The redundancy and self-adapting techniques are combined in such a manner so as to provide at the first level of redundancy, at least three logic units for performing a given logical operation which units are arranged in parallel, with each unit in a normally operating condition. The outputs of these three units are coupled to a majority gate, or vote taker, in an input-output unit. With respect to the second level of redundancy, in each logic unit there is provided one set of circuit component parts to be in a normally operating condition with at least one other set arranged in parallel with said one set to be in a standby condition. Each set by itself is capable of performing a given logical function. Further, each logic unit is provided with an adaptive circuit component which in response to external stimuli has the ability to (1) insert normally operating circuit component parts into the overall logic performing circuitry of the unit so as to correctly perform a given logical function, or (2) insert standby circuit component parts into the circuit operation in instances where the normally operating circuit component parts have failed. Essentially, the referred to adaptive circuit component allows the unit to learn for the first time a given logical function, or re-learn said function after one or more of its normally operating component parts have failed. The external stimulus may be provided from the input-output unit and is a signal automatically derived from the majority response of the three units. Alternatively, the external stimulus may be a signal derived from the output of one of the properly operating units, or may be a signal manually applied.

The referred to additional adaptive circuitry is constructed in accordance with a set of logical rules for allowing it to insert or remove normally operating or standby circuit component parts, as the case may be, in the overall unit circuitry for performing a given logical function. In response to the external stimulus, which stimulus is selectively applied as the unit is learning or re-learning a logical function, the logic of said unit is orderly changed as it performs in response to various input sequences.

To make clear the advantage provided by the present invention over conventional straight redundancy circuitry the following discussion may be considered which compares continuity of operation for the worst case condition of failure of identical component parts. For conventional circuitry having six orders or redundancy, two failures of identical component parts can be tolerated but three failures are fatal for logic requiring the operation of said component parts, since the majority logic fails. In the present invention, for three units at the first level of redundancy and two sets of identical component parts at the second level, corresponding to six orders of redundancy, three failures of identical component parts can be tolerated on a statistical basis about 8 out of 10 times and four failures can be tolerated about 4 out of 10 times, depending upon in which units the failures occur. As the order of redundancy at the second level is increased, further advantage is gained. Thus, for a straight redundancy of 12, up to five failures are tolerable. In the present invention, for a corresponding order of redundancy up to 10 failures are possible. In addition, whereas in the conventional circuitry the number of continuously operating components is equal to the order of redundancy, in the present invention, the number of continuously operating components is equal to only the order of redundancy at the first level.

While the specification concludes with claims particularly pointing out and distinctly claiming the invention, it is believed that the invention will be better understood from the following description taken in connection with the accompanying drawings in which:

Figures 1, 2, 3, 4A, 6:
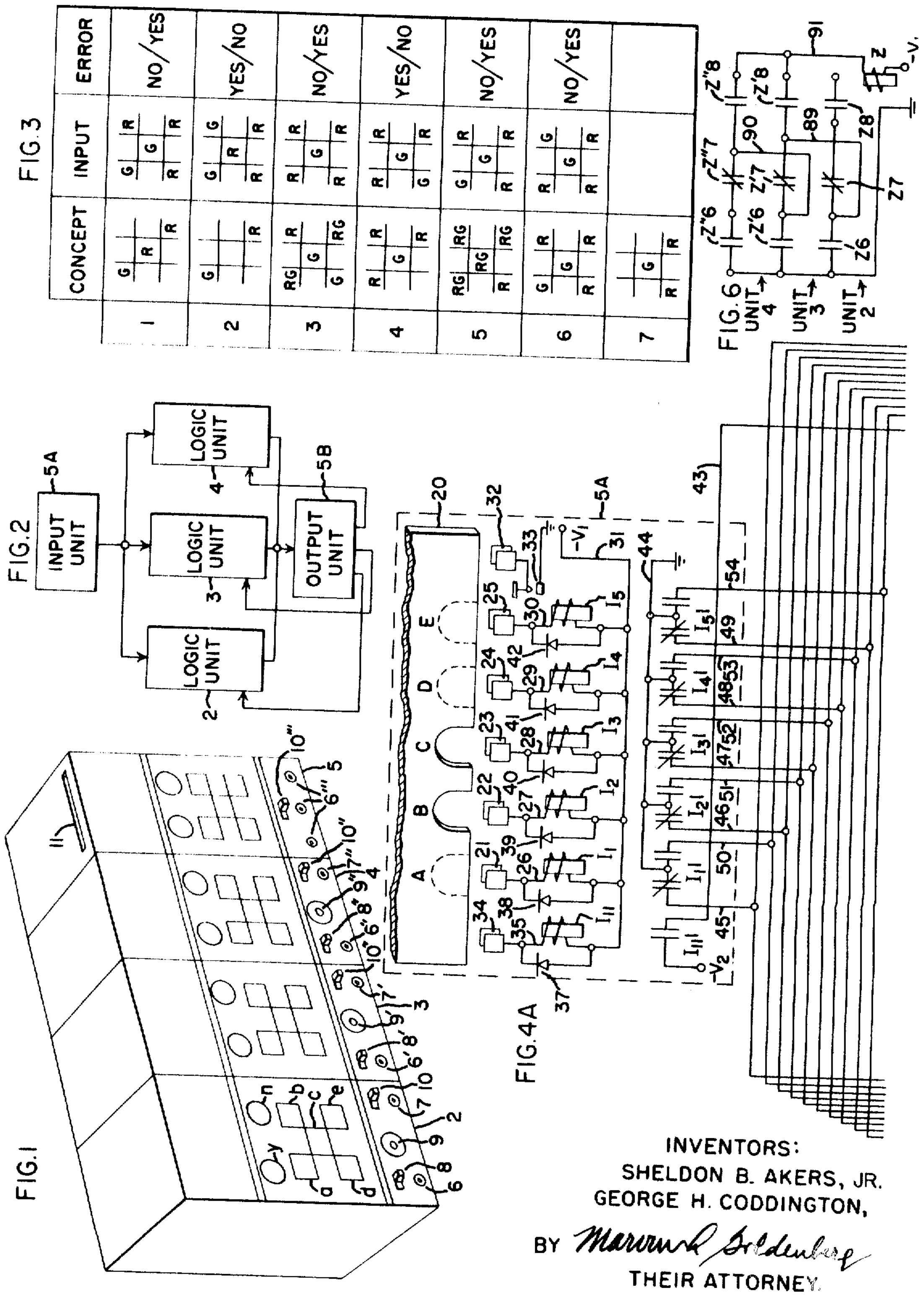
FIGURE 1 is a perspective view of a digital computer equipment constructed in accordance with the invention.
FIGURE 2 is a block diagram of the circuitry of the equipment of FIGURE 1.
FIGURE 3 is a graph of a typical learning cycle employed to illustrate the manner in which a given set of rules may be used to teach any one of the three logic units shown in FIGURE 2.
FIGURES 4A, 4B and 4C are detailed schematic diagrams of the input unit, the three logic units and the output unit, respectively, of the circuit shown in block form in FIGURE 2.
FIGURE 6 is a schematic diagram of the "yes, no" output majority gate for the three logic units of FIGURE 4B.

Referring now to FIGURE 1, a digital computer type equipment 1 embodying the principles of the invention is illustrated in a perspective view. The equipment 1 is seen to consist of three basic logic units 2, 3 and 4, each capable of providing numerous logical functions such as multiple AND functions, and an input-output unit 5 which supplies common inputs to said logic units as well as providing the majority output from said units. As shown by the circuit block diagram of the equipment in FIGURE 2, the units 2, 3 and 4 are connected in parallel and operate together. The input-output unit 5 is shown in two sections by an input block 5A and an output block 5B.

The front panels of each of units 2, 3, 4 and 5 have, as shown in FIGURE 1, five indicator positions *a*, *b*, *c*, *d* and *e*, corresponding to five input positions. One of two binary information bits is displayed by the indicators in the form of two differently colored lights which selectively appear in each position. For example, red and green lights may be employed corresponding to a binary "1" and "0," respectively. The lights that are lit in the indicator positions *a* to *e* of each unit represent the stored "concept" of the unit. The light display itself is merely an indication of the unit's state and is not necessary for the basic unit operation. In normal operation the units have stored therein the same concept. Indicator positions *a*, *b*, *c*, *d* and *e* of input-output unit 5 are lit in accordance with the majority response of corresponding positions in units 2, 3 and 4. Each panel further includes a "yes" light *y* and a "no" light *n*, the "yes" light being indicative of a "1" and the "no" light a "0." The "yes," "no" lights of units 2, 3 and 4 are lit in accordance with how an input compares with the stored concept of each unit. The input-output unit 5 responds to the majority of the "yes," "no" lights lit in the logic units 2, 3 and 4 and its "yes," "no" lights are lit accordingly.

In an AND gate operation, if an applied input contains information corresponding to the concept held by a unit, the "yes" light will be lit. Conversely, if an applied input does not contain such information, the "no" light will be lit. For example, if it is assumed that the concept held by a unit is represented as a red light in each of the indicator positions *a*, *b*, *c*, *d* and *e*, there is in effect a five input AND gate which requires five "1's" to be applied at the input to obtain an output of "yes" or "1." Any other input must result in an output of "no" or "0." It may be recognized that numerous stored concepts can be held by a unit and therefore numerous logical AND functions can be performed. For example, the stored concept can be $a,b=1$; $a$, $b=0$, $a$, $b=1$ and $c=0$; $a$, $c$, $d=1$ and $b$, $e=0$; etc. For a maximum five input device there are 242 possible stored concepts. In its capability to provide variable input AND functions, each logic unit can also function as a binary pattern detector for detecting any one of 242 binary patterns. For a further treatment of binary patern detectors reference is made to the previously referred to article by S. B. Akers.

In a similar manner, if a logic input is programmed so as to provide a "yes" output when any one information bit of a stored concept is included in an input, the unit operates as an inclusive OR gate. Further, if the unit is made to respond with a "yes" output to a number more than one of the information bits of a stored concept included in an applied input, a logical operation of two out of three, four out of five, etc., type is provided.

As has been noted hereinbefore, units 2, 3 and 4 are operated in parallel to provide a first level of redundancy. Thus, should any one logic unit fail, operation of the overall equipment will not be affected since the remaining two units are sufficient to maintain proper operation.

However, since the equipment does depend upon a majority logic, failure of two logic units will cause the overall equipment to fail. Within each of units 2, 3 and 4 are included two logic performing circuit components for each position thereof, to be described in detail when considering FIGURE 4B. A second level of redundancy is obtained by providing in each of the logic performing circuit components of each unit at least two identical sets of logic performing circuit component parts which are coupled in parallel but, distinct from the first level of redundancy, are operated alternatively rather than simultaneously. Accordingly, one set of circuit component parts in each unit may be considered to be the normally operating component parts and the remaining set or sets in each unit the standby component parts. The standby component parts are individually and selectively inserted into the operating portion of the circuit when their sister parts fail, upon a detection of such failure.

Figure 4B:
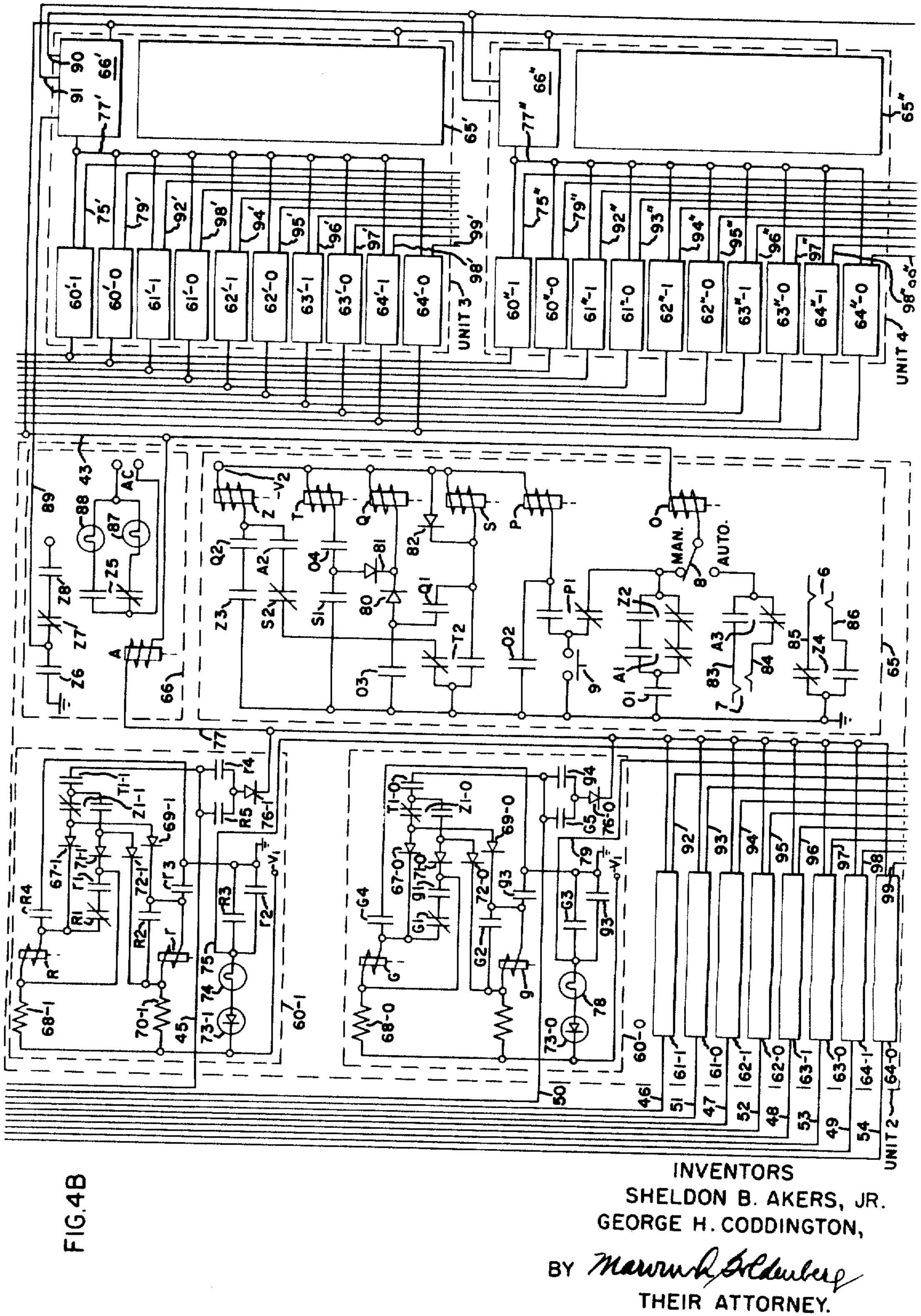

In addition to the logic performing circuit components, each logic unit is provided with adaptive circuitry, shown in FIGURE 4B and to be described presently. In response to supplied external stimuli, the adaptive circuitry permits the individual units to initially learn a given logical operation, or re-learn a given logical operation after having malfunctioned. The adaptive characteristic of each logic unit makes possible the automatic insertion of a standby component part into the operating portion of the circuit as required due to failures within the unit. By means of a set of rules, to be discussed in detail presently, every time a logic unit responds either "yes" or "no" incorrectly, its logic performance thus being in error, the unit is "punished" by external stimuli. The external stimuli are applied to the adaptive circuitry and serve to successively change the unit's concept, and also logical performance, each time a punishment is necessary. The referred to external stimuli may be applied either manually or automatically and is preferably applied automatically from the input-output unit, as schematically represented by the feedback connections in FIGURE 2.

It is seen in FIGURE 1 that each of the units 2, 3 and 4 includes a teach jack 6, a learn jack 7, an automatic-manual switch 8, a button operated punish switch 9, as well as an on-off switch 10. Prime and double prime notations are used for units 3 and 4, respectively. Input-output unit 5 includes three teach jacks 6''', an on-off switch 10''' and a slot 11 for inserting the input information by means of a card 20, shown in FIGURE 4A. With the automatic-manual switch in the manual position, the units are punished by actuating the punish button. With the automatic-manual switch in the automatic position, a similar punishment may be provided by coupling to the learn jack of the unit to be punished from one of the teach jacks 6''' of the input-output unit 5 or from the teach jack of one of the other units which is operating properly. Thus, in the automatic punish condition, a correct "yes," "no" output response is fed back to provide the punish function to a unit which is incorrectly operating.

In practice, the adaptive process within each logic unit which allows it to initially learn a given logical function proceeds as follows: With a particular input pattern selected for an AND gate operation (for example, an input of $c=0$ and $d$, $e=1$; which corresponds to a concept within each of the units represented by a green light being lit in indicator position $c$ and a red light being lit in indicator positions $d$ and $e$ to provide a "yes" response) the unit is successively given inputs at random both with and without the above indicated pattern. Whenever an error occurs, i.e., an output of "yes" is produced when the input does not contain the indicated pattern or a "no" appears when the pattern is present, which corresponds to the stored concept within the unit being incorrect, the unit is punished, e.g., by actuating the punish switch 9. The unit will change its concept and the output response of the unit will then change to be correct. The present concept is always displayed by the indicator positions $a$ to $e$. After a number of errors, on the average 6 or 7, the unit adapts to the correct concept and thereafter responds correctly to all inputs.

It is noted that the above initial learning process is provided by pressing the punish button, with the automatic-manual switch in the manual position. A similar procedure is carried out for enabling a malfunctioning unit to learn or re-learn a given logical function when the remaining two logic units are properly operating. In this case, the malfunctioning unit's automatic-manual switch is in the automatic position. An output from one of the teach jacks of the input-output unit 5 (which output is employed in the preferred mode of operation of the equipment, although an output from the teach jack of one of the remaining two properly operating units may also be used) is coupled to the learn jack of the malfunctioning unit. Similar to the above described initial learning process, the malfunctioning unit will change its concept in accordance with signals applied to its learn jack until it too adapts to the correct concept.

The logical rules by which a logic unit learns a particular desired concept may be made quite simple. There are only two types of errors which can occur. They are a YES/NO error, i.e., the output is "yes" but should be "no," and a NO/YES error, i.e., the output is "no" but should be "yes." For a YES/NO error the presently stored concept is completely included in an applied input but the desired concept is not so included. Thus, the unit performs as though its presently stored concept is the correct one when it is actually incorrect. For a NO/YES error the presently stored concept is not completely included in an applied input but the desired concept is so included, so that the unit performs as though the presently stored concept is incorrect when it is actually correct.

To the above two types of errors, the unit operates as follows when it is punished:

*Rule 1.*—For YES/NO errors—all lights go on in indicator positions $a$ to $e$ that disagree with the corresponding input.

*Rule 2.*—For NO/YES errors—all lights go off in indicator positions $a$ to $e$ that disagree with the corresponding input.

In addition, for YES/NO errors, the "yes" light goes off and the "no" light goes on. For NO/YES errors, the "no" light goes off and the "yes" light goes on.

It may be noted that both lights corresponding to a particular input variable may be on simultaneously as a result of a YES/NO error. In this state the unit will always respond with a "no" to any input.

By referring to the graph shown in FIGURE 3, it may be seen how these rules operate in practice. Let it be assumed that a unit has an initially stored concept of $a=0$ and $c$, $e=1$, which would be displayed as a green light in position $a$ and a red light in positions $c$ and $e$, as illustrated in step 1 of the graph. It may be appreciated that with the indicated stored concept, the unit is an AND gate for inputs in the positions of the stored concept and when such inputs correspond to the stored concept a "yes" output response is provided. For any other inputs a "no" output response occurs. If now the unit is to be retrained to have a concept different from the initially stored concept, and therefore to provide a different AND function, e.g., a new concept of $c=0$ and $d$, $e=1$, a typical training cycle might proceed as indicated by steps 1 through 7 in the graph of FIGURE 3. Thus, considering the input applied for step 1, it may be seen to include the new concept and so the unit should respond with a "yes." However, since the initially stored concept is not included in the applied input the unit instead replies "no," and there is therefore a NO/YES error. As seen by Rule 2, for a NO/YES error, in response to a punishment all lights go off that disagree with the corresponding input. Accordingly, the stored concept is changed to appear as shown in step 2 of the graph.

In addition, it may be appreciated that the "no" light goes off and the "yes" light turns on, which is not indicated in the graph. With now a second input applied which is seen not to include the desired concept, the unit should respond "no." However, because the now stored concept in step 2 is included in the applied input, the unit responds "yes" and we have a YES/NO error. It is seen from Rule 1 that for YES/NO errors, in response to a punishment, all lights go on that disagree with the corresponding input. The stored concept will then change to appear as shown in step 3 of the graph. Also, the "yes" light turns off and the "no" light turns on. With successively applied random inputs the stored concept is correspondingly successively changed until it becomes the desired concept. This is seen to occur in step 7.

To prove that a unit will always learn a desired concept after a finite number of errors the following reasoning may be employed:

(1) After each YES/NO error at least one additional light will be on correctly. (This follows from the fact that a YES/NO error will only occur when at least one light that disagrees with the input is off incorrectly. Hence, by Rule 1 such lights will be turned on.)

(2) Once on correctly, a light will not go off. (Lights only go off for NO/YES errors and since the desired pattern must be present in the input for these errors, those lights on correctly will stay on because they agree with the input.)

(3) Only a finite number of NO/YES errors can occur consecutively. (After each NO/YES error at least one more light will be off. Hence, the point would be reached where the only lights on should be on. In this case clearly only YES/NO errors can occur.)

(4) Once all lights are on that should be on only NO/YES errors can occur.

From (1), (2) and (3) above, it follows that all lights that should be on will be on after a finite number of errors. Likewise, from (3) and (4), it follows that the lights which should be off will then go off in a finite number of steps.

In FIGURE 3, for example, note that one light was on correctly in the stored concept at the start, i.e., in position *e*. This number increased to two in step 3 after the first YES/NO error, i.e., in positions *c* and *e*, and to three in step 5 after the second YES/NO error. The incorrect lights then went off in steps 6 and 7 as a result of the last two NO/YES errors.

Once a logic unit learns a particular concept, it can assume the role of teacher for other basic units by feeding its "yes, no" output to these other units, permitting these units to adapt themselves by monitoring this output. However, it is the more common practice, as noted previously, for the "yes, no" majority output from input-output unit 5 to be employed to teach a malfunctioning unit.

Figures 4C, 5, 7:
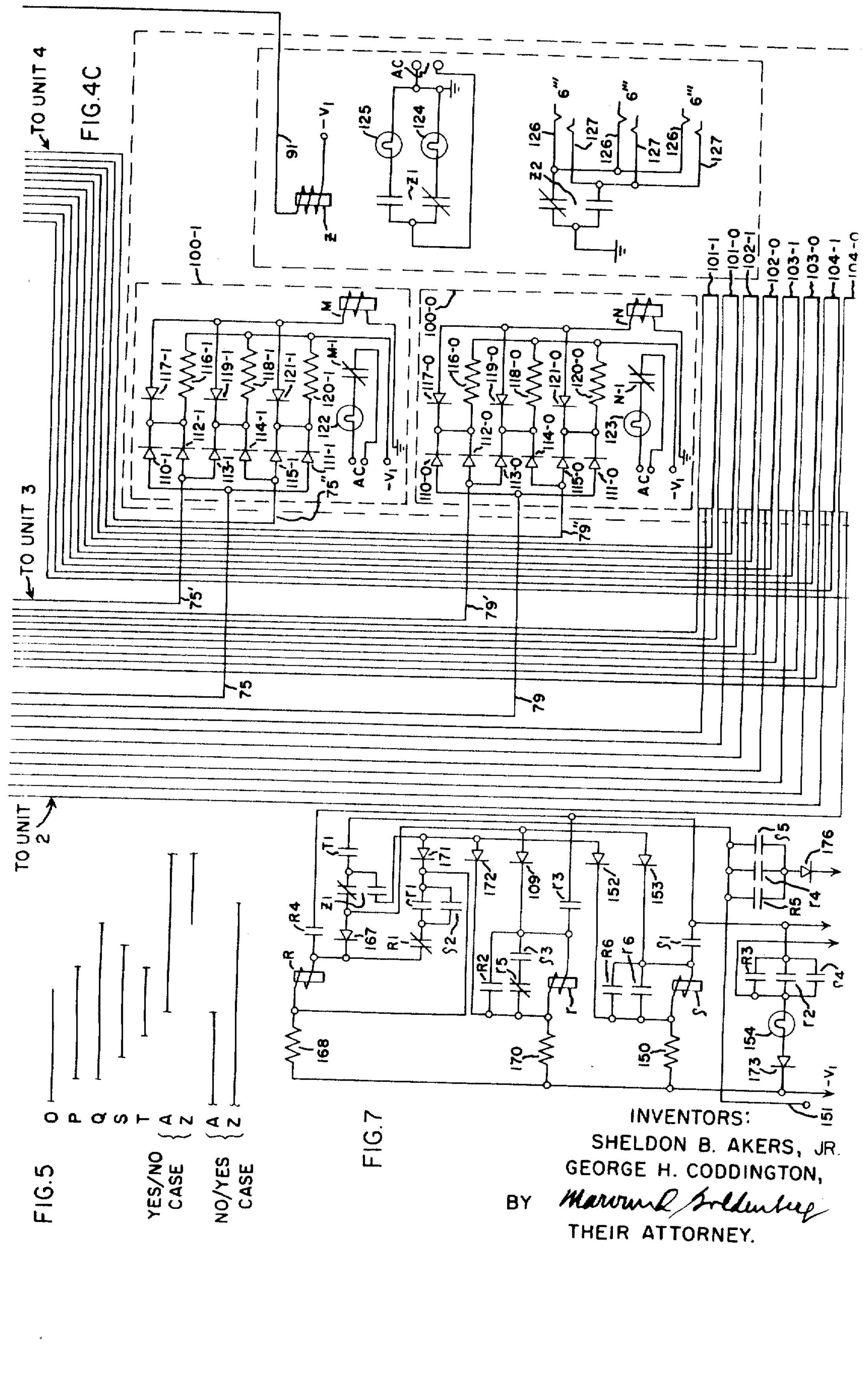
FIGURE 5 is a graph of the timing sequence of the operation of the adaptive circuitry included in FIGURE 4B.
FIGURE 7 is a detailed schematic diagram of a modified logic performing component that can be readily employed in the logic units of FIGURE 4B.

With reference to FIGURES 4A, 4B and 4C, a detailed schematic circuit diagram is illustrated of the above described equipment which, in general, conforms to the block diagram of FIGURE 2. The schematic diagram of FIGURE 4A illustrates the circuitry of the input block 5A. FIGURE 4B illustrates the circuitry of logic units 2, 3 and 4 and FIGURE 4C illustrates the circuitry of the output block 5B. It is seen that FIGURES 4B and 4C are partly in block form for the purpose of avoiding a duplicated illustration of identical circuitry, thereby facilitating understanding of the equipment's construction and operation.

The input block 5A of FIGURE 4A includes input knife-edge contacts 21, 22, 23, 24 and 25 which are connected by conductors 26, 27, 28, 29 and 30, respectively, to one side of input relay coils $I_1$, $I_2$, $I_3$, $I_4$ and $I_5$, respectively. The other side of relay coils $I_1$ to $I_5$ are joined together and connected by a conductor 31 to a source of minus potential $-V_1$. Closed circuits are selectively provided for relay coils $I_1$ through $I_5$ upon introducing input information to the unit by means of an input card 20.

Card 20 is fabricated of conducting material, e.g., aluminum, having notches selectively cut in five positions of the end region thereof in accordance with a given information input. The card input variable positions are identified as A, B, C, D and E to correspond to indicator positions *a* to *e* of the units. In the example being considered, each position in which a notch is not cut out corresponds to a binary "1" and each position in which a notch is cut out corresponds to a binary "0." It may be appreciated that although card 20 was employed in one operative embodiment of the invention, alternative means well known to the art can be readily employed for introducing the input information. Further, it should be noted that although a maximum of five input variables are employed in the specific equipment described, in no way is this number intended as a limitation.

Upon insertion of the card 20 into the input unit 5A, the unnotched portions engage corresponding input contacts to provide a closed circuit for energizing the associated relays. The closed circuit is made through the card and through a further knife-edge contact 32 which is coupled through a microswitch 33 to ground. The microswitch 33 is closed when the input card is properly seated and ensures that each of the input contacts intended to be engaged is so. It is seen that in portions where notches are cut out, the input contacts are not engaged and their associated relays are not energized. A further knife-edge contact 34 is connected by conductor 35 to a relay coil $I_{11}$, the other side of which is connected by conductor 31 to source $-V_1$. Relay $I_{11}$ is provided for energizing a portion of the adaptive circuits in units 2, 3 and 4 only upon application of an input, as will be seen. Diodes 37, 38, 39, 40, 41 and 42 are connected in shunt with relay coils $I_{11}$ and $I_1$ through $I_5$, respectively, in a backward biased direction so as to stabilize the voltage across these relay coils and avoid damaging arcing at the knife-edge contacts.

Associated with relay coil $I_{11}$ is a normally open single pole, single throw switch $I_{11}$1. One contact of switch $I_{11}$1 is connected to a source of minus potential $-V_2$ and its other contact is connected by a conductor 43 to units 2, 3 and 4 of FIGURE 4B. Associated with relay coils $I_1$, $I_2$, $I_3$, $I_4$ and $I_5$ are single pole, double throw switches $I_1$1, $I_2$1, $I_3$1, $I_4$1 and $I_5$1, respectively, each of which have a pair of normally closed contacts and a pair of normally open contacts, as indicated in the drawing. A ground point is connected by a conductor 44 through each of the normally closed contacts of relay switches $I_1$1, $I_2$1, $I_3$1, $I_4$1 and $I_5$1 to conductors 45, 46, 47, 48 and 49, respectively. Correspondingly, the ground point is connected by conductor 44 through each of the normally open contacts of switches $I_1$1 through $I_5$1, when in their operated position, to conductors 50, 51, 52, 53, and 54, respectively. Each of conductors 45 through 54 are connected as inputs to units 2, 3 and 4 of FIGURE 4B.

Referring now to FIGURE 4B, there is shown the circuit diagram for units 2, 3 and 4. As indicated hereinbefore, each unit is identical in its circuit construction so that a detailed schematic diagram is presented for unit 2, with only blocks being shown in units 3 and 4 for corresponding portions of the circuit of unit 2. Each of units 2, 3 and 4 includes ten logic performing circuit components 60–1, 60–0, 61–1, 61–0, 62–1, 62–0, 63–1, 63–0, 64–1, 64–0, a prime and double prime notation being employed for units 3 and 4, respectively, for all like components. There is also included in each of units 2, 3 and 4 an adaptive circuit component 65 and a "yes, no" output circuit component 66. Logic performing components 60–1 correspond to one of the two binary information bits for indicator position *a*, in the illustration given providing the red or "1" information. Similarly, logic performing components 60–0 correspond to the other of the two binary information bits for indicator position *a*, in the illustration given providing the green or "0" information. Correspondingly, logic performing components 61–1 through 64–0 provide the red and green information for indicator positions *b*, *c*, *d* and *e*. Only logic performing components 60–1 and 60–0 of unit 2 are shown in detail. It may be appreciated that the remaining logic performing components are identical in their construction and operation and, therefore, their circuit diagrams need not be repeated. The adaptive circuit component 65 and the "yes, no" output circuit component 66 of unit 2 are shown in detail, the corresponding circuit components of units 3 and 4 being of identical circuitry.

The schematic circuit diagram of learning logic component 60–1 of unit 2 will now be considered. Conductor 45 from the input unit 5A of FIGURE 4A supplies the input thereto for selectively energizing or de-energizing relay R or *r*, as the case may be, as dictated by the operation of a punish sequence, to be explained in detail presently. Relay R is the normally operative relay and relay *r* is the standby part. Conductor 45 is connected to one side of a normally open single pole, single throw switch T1–1 of relay coil T, included in the adaptive circuit component 65. The other side of switch T1–1 is connected to a single pole, double throw switch Z1–1. Switch Z1–1 is associated with relay coil Z which is included in the adaptive circuit component 65. The normally closed contacts of Z1–1 are connected through a diode 67–1, poled in the forward direction, to one side of relay coil R for energizing said coil. The other side of relay coil R is connected through a current limiting resistor 68–1 to potential source $-V_1$. Similarly, the normally closed contacts of Z1–1 are connected through a forward poled diode 69–1 to one side of relay coil *r*, the opposite side thereof being connected through a current limiting resistor 70–1 to source $-V_1$.

The normally open contacts of Z1–1 are connected through a forward poled diode 71–1 to said other side of relay coil R for providing a shunt path therearound for de-energizing the coil. Similarly, the normally open contacts of Z1–1 are connected through a forwarded poled diode 72–1 to said other side of relay coil *r*. A further shunt path is provided around relay coil R which connects said other side of coil R through a normally open single pole, single throw switch *r*1, a normally closed single pole, single throw switch R1, and diode 67–1 to the normally closed contacts of Z1–1. A further shunt path is also provided around relay coil *r* which connects said other side of coil *r* through a normally open single pole, single throw switch R2 and diode 69–1 to the normally closed contacts of Z1–1. The above two additional shunt paths provide a pre-emption of operation of relay coil R over relay *r* so that if both are capable of proper functioning only relay R will be operative and relay *r* will be in a standby condition. A connection is provided from source $-V_1$ through a zener diode 73–1 and through a red lamp 74 to a conductor 75 which is coupled to a red concept majority gate in output unit 5B in FIGURE 4C. Similar outputs from components 60′–1 and 60″–1 are taken by conductors 75′ and 75″, respectively, which are coupled to the same red concept majority gate. The output terminal of red lamp 74 is also connected through the parallel path of normally open single pole, single throw switches R3 and *r*2 to ground. A path for holding energization of relay coil R is completed by a connection from ground through a normally open single pole, single throw switch R4. Likewise, a path for holding relay coil *r* energized is completed by a connection from ground through a normally open single pole, single throw switch *r*3.

Input conductor 45 is also connected through a parallel branch of normally open single pole, single throw switches R5 and *r*4 and through a diode 76–1 poled in the forward direction. The output of diode 76–1 is connected by a conductor 77 to one side of a relay coil A included in the adaptive circuit component 66, the other side of relay coil A being connected to the conductor 43. Correspondingly, connections similar to those above described are made in units 3 and 4, only conductors 77′ and 77″, being shown, however.

The learning logic component 60–0 of unit 2 is identical in its circuitry to that of component 60–1 with the exception that relays R and *r* are replaced by relays G and *g*, respectively, red lamp 74 is replaced by a green lamp 78. The remaining circuit components T1–0, Z1–0, 67–0, 68–0, 69–0, 70–0, 71–0, 72–0 and 76–0 are identical in construction and operation to corresponding component parts above described. Conductor 50 is connected as the input to component 60–0. A first output of component 60–0 is taken from the green lamp 78 and coupled by conductor 79 to a green concept majority gate in output unit 5B in FIGURE 4C as will be seen. A second output from diode 76–0 of component 60–0 is connected to conductor 77 in similar fashion to the connection made from diode 76–1 of component 60–1. Output conductors 92, 93, 94, 95, 96, 97, 98 and 99 are taken from components 61–1 through 64–0, respectively, in unit 2, with corresponding output conductors having a prime and double prime notation in units 3 and 4, respectively, and applied to appropriate red and green concept majority gates in unit 5B.

Accordingly, logic performing circuit components 60–1 and 60–0 of unit 2 provide that portion of the stored concept with respect to position *a* of unit 2. Correspondingly, components 61–1 and 61–0 provide that portion of the stored concept for indicator position *b*. The remaining logic performing circuit components 62–1 through 64–0, taken in pairs, similarly provide the stored concept for indicator positions *c*, *d* and *e*. As may be recognized, circuit components 60–1 through 64–0 of units 3 and 4 provide a corresponding operation with respect to the stored concept of these units.

With reference now to the adaptive circuit component 65 of unit 2, relay coils O, P, Q, S, T and Z and their associated switching contacts are provided which, in response to an external stimulus, function so as to cause the logic performing circuit components to alter their operation so as to either initially adapt to a given concept or re-learn a given concept after having malfunctioned in some portion thereof. The external stimulus is supplied either manually or automatically as determined by the position of automatic-manual switch 8. As will be seen, the switching circuitry of adaptive component 65 is arranged so that relays O, P, Q, S and T are sequentially operated to, in turn, cause relays A and then Z to be sequentially either energized or de-energized, as dictated by the proper concept to be learned.

Conductor 43 is connected to one side of the relay coil O, the other side being connected to automatic-manual switch 8. When in the manual position, a connection is made through the normally closed contacts of a single pole, double throw switch P1 of relay P and through the manual punish switch 9 to ground, so that when the punish switch is closed relay O is energized. In addition, with switch 8 in the manual position a connection is made for holding relay coil O energized so long as relays A and Z are in the same state. Thus, relay coil O is also connected to a parallel branch circuit including, serially connected in one branch, the normally closed contacts of single pole, double throw switches Z2 and A1 and, serially connected in the other branch, the normally open contacts of switches Z2 and A1. The other side of the parallel branch circuit is connected through normally open single pole, single throw switch O1 of relay O to ground. One side of relay coil P is connected to source $-V_2$. The normally open contacts of switch P1 connect punish switch 9 to the other side of coil P. Said other side of relay coil P also being connected through a normally open single pole, single throw switch O2 to ground for energizing coil P. Energization of relay P disconnects the manual switch 9 from relay coil O, by means of P1, so that the adaptive circuit operation can properly proceed independent of how long a time the punish switch is held closed.

One side of each of relay coils Q, S, T and Z is connected to source $-V_2$ and the other side of each of said relay coils is connected to the switching circuitry for selective operation thereof, as will be described presently. The other side of relay coil Q is connected through the serial connection of forward poled diode 80 and the normally open contacts of single pole, single throw switch O3 to ground for providing energization thereof. The side of relay coil Q connected to diode 80 is also connected through the serial connection of forward poled diode 81 and the normally open single pole, single throw switch S1 to ground for holding relay coil Q energized. The other side of relay coil S is connected to ground through the serial connection of normally open single pole, single throw switch Q1 and switch O3 for providing energization thereof. In addition, the side of relay coil S joined to switch Q1 is also connected through the normally open contacts of single pole, double throw switch T2 to ground. Connected in shunt with relay coil S is a diode 82 poled in a backward biased condition and providing stabilization of the voltage across the relay coil, which protects diode 80 when relay S releases. The other side of relay coil T is connected through the serial connection of a normally open single pole, single throw switch O4 and switch S1 to ground for providing energization thereof. Relay coil Z is energized through a path from the other side thereof to ground which includes, in the order recited, the serial connection of normally open single pole, single throw switch A2, normally closed single pole, single throw switch S2 and the normally closed contacts of switch T2. Thus, with no punish signal aplied and the adaptaive circuit nonoperative, if relay A is energized, relay Z is also energized, and if relay A is de-energized, relay Z is de-energized. During an operating sequence of the adaptive circuit relay coil Z if previously energized, is held energized through a path from its other side to ground including the serial connection of normally open single pole, single throw switch Q2 and normally open single pole, single throw switch Z3.

With the automatic-manual switch 8 in the automatic position, a connection is made from the other terminal of relay coil O through the normally open contacts of a single pole, double throw switch A3 to a conductor 83 and through the normally closed contacts of switch A3 to conductor 84. Conductors 83 and 84 are connected to the sleeve and tip, respectively, of learn jack 7 of unit 2. The sleeve of teach jack 6 is connected by a conductor 85 through the normally closed contacts of a single pole, double throw switch Z4 to ground. The tip of teach jack 6 is connected by a conductor 86 through the normally open contacts of switch Z4 to ground. In the case where one of the units 3 or 4 is employed to provide the external stimulus to the adaptive circuit 65 of unit 2 by connecting either teach jack 6′ or 6″ to learn jack 7, the conductor of teach jacks 6′ or 6″ corresponding to conductor 85 is connected to conductor 83 of learn jack 7, and the conductor corresponding to conductor 86 is connected to conductor 84.

Referring now to the "yes, no" output circuit component 66 of unit 2, there are provided "yes" and "no" lamps 87 and 88, respectively, which are connected in parallel with one terminal thereof coupled together to one side of an A-C potential source AC. The other terminal of "yes" lamp 87 is connected through the normally closed contacts of a single pole, double throw switch Z5 to the other side of source AC, and the other terminal of "no" lamp 88 is connected through the normally open contacts of switch Z5 to the other side of source AC. In addition, a portion of the majority gate for the "yes, no" response is contained in the block 66. This circuit includes the serial connection of a normally open single pole, single throw switch Z6, a normally closed single pole, single throw switch Z7 and a normally open single pole, single throw switch Z8. The junction of switches Z6 and Z7 is connected by conductor 89 to a similar circuit in unit 3. The other side of switch Z6 is connected to ground. Conductors 90 and 91 couple together comparable majority gate portions in 66′ and 66″ of units 3 and 4, conductor 91 also being connected to output unit 5B in FIGURE 4C. The composite "yes, no" majority gate circuitry including the segmented portions thereof contained in each of the units 2, 3 and 4 as well as that portion in the output unit 5B are illustrated in FIGURE 6 and will be discussed presently.

The output unit 5B, shown in the partially detailed schematic circuit diagram of FIGURE 4C includes red and green concept majority gates 100–1, 100–0, 101–1, 101–0, 102–1, 102–0, 103–1, 103–0, 104–1 and 104–0. Red concept majority gate 100–1 and green concept majority gate 100–0 are shown in detail. The remaining gates, taken in pairs are identical to gates 100–1 and 100–0 and are shown in block form. Conductors 75, 75′ and 75″ apply three inputs to gate 100–1 from each of logic performing components 60–1, 60′–1 and 60″–1, respectively, of units 2, 3 and 4, gate 100–1 providing an output response which indicates the majority condition of its inputs. Conductors 79, 79′ and 79″ apply three inputs to gate 100–0 from components 60–0, 60′–0 and 60″–0, respectively, of units 2, 3 and 4, gate 100–0 providing an output which is the majority condition of its inputs. Similary, each of the remaining gates 101–0 through 104–0 has three inputs applied thereto from corresponding components 61–1 through 64–0 of units 2, 3 and 4.

Referring now to the circuit of gate 100–1, the first input applied thereto by conductor 75 is connected jointly to one side of a first and second diode 110–1 and 111–1, each poled to conduct current in a direction away from from the input. The second input applied by conductor 75′ is jointly connected to one side of third and fourth diodes 112–1 and 113–1, poled to conduct current in a direction away from the input. The third input applied by conductor 75″ is jointly connected to one side of fifth and sixth diodes 114–1 and 115–1, poled to conduct current in a direction away from the input. The other sides of diodes 110–1 and 112–1 are joined together, as are the other sides of diodes 113–1 and 114–1 and diodes 115–1 and 111–1. Source $-V_1$ is connected through a first path including a resistor 116–1 and a normally forward biased diode 117–1 for energizing a relay coil M, source $-V_1$ being directly coupled to one side of resistor 116–1, the other side thereof being connected to the junction of diodes 110–1 and 112–1 and 117–1. Similarly, source $-V_1$ is connected through a second path including resistor 118–1 and normally forward biased diode 119–1 for energizing relay M, resistor 118–1 and diode 119–1 being joined to the junction of diodes 113–1 and 114–1. Finally, a third path for energizing relay M is coupled to source $-V_1$, including resistor 120–1 and normally forward biased diode 121–1, resistor 120–1 and diode 121–1 being joined to the junction of diodes 111–1 and 115–1. A normally closed single pole, single throw switch M1 connects a red lamp 122 to potential source AC.

In the above described circuit, at least any two like inputs will cause the relay M to be energized or de-energized in accordance with the nature of the input. For example, if it is assumed that components 60–1 and 60′–1 of units 2 and 3 have a stored concept of red or "1", input conductors 75 and 75′ to the majority gate 100–1 are essentially at ground. The junctions of diodes 110–112, 113–114 and 115–111 are, accordingly, at ground and relay M is de-energized. The red lamp 122 will be lit. Correspondingly, if at least any two inputs to the majority gate are of negative potential, for instance, wherein components 60–1 and 60′–1 do not have a stored red concept, the above referred to diode junctions are at a negative potential and relay M is energized. Thus red lamp 122 will not be lit.

Gate 100–0 includes diodes 110–0, 111–0, 112–0, 113–0, 114–0, 115–0, 117–0, 119–0 and 121–0, and resistors 116–0, 118–0 and 120–0, which are identical to the corresponding component parts of gate 100–1. Accordingly, the construction and operation of gate 100–0 is similar to gate 100–1 except that it responds to a stored "green" concept and lights a green lamp 123 by means of a relay N.

Output unit 5B additionally includes a relay coil Ƶ, which is a component part of the composite "yes, no" majority gate, having one terminal connected to conductor 91 and the other terminal to source $-V_1$. Relay coil Ƶ is energized or nonenergized in accordance with the majority state of the Z relays of units 2, 3 and 4.

In FIGURE 6, there is illustrated the composite "yes, no" majority gate showing the interconnections between the segmented portions thereof contained in each of the units 2, 3 and 4. The segmented portion for unit 2, including switches Z6, Z7 and Z8, is shown in FIGURE 4B. The remaining segmented portions include switches Z'6, Z'7 and Z'8 for unit 3 and Z''6, Z''7 and Z''8 for unit 4 which are included in blocks 66' and 66'', respectively, of units 3 and 4, but are not specifically shown in FIGURE 4B.

Referring again to the output unit 5B of FIGURE 4C, there are also provided "yes" and "no" lamps 124 and 125, respectively, connected in parallel, with one terminal thereof coupled together to one side of potential source AC. The other terminal of "yes" lamp 124 is connected through the normally closed contacts of single pole, double throw switch Ƶ1 to the other side of source AC, and the other terminal of "no" lamp 125 is connected through the normally open contacts of switch Ƶ1 to the other side of source AC.

Three teach jacks 6''' are connected in parallel, each having its sleeve terminal coupled by a conductor 126 through the normally closed contacts of single pole, double throw switch Ƶ2 to ground. The tip terminals of teach jacks 6''' are coupled by a conductor 127 through the normally open contacts of switch Ƶ2 to ground. In the preferred mode of operation, teach jacks 6''' are individually coupled to the learn jacks 7, 7' and 7'' of units 2, 3 and 4, e.g., using standard two conductor patch cords. Conductors 126 and 127 are connected to conductors 83 and 84, respectively, in unit 2, with similar connections made to units 3 and 4.

The illustrated embodiment of the invention is implemented in accordance with Rules 1 and 2, given above, and also the following Boolean equations which may be related to the logic performing components:

$$R^{n+1}=\bar{r}^{n}(Z^{n}\bar{I}^{n}+R^{n}I^{n}) \quad (1)$$

$$r^{n+1}=r^{n}(Z^{n}+I^{n})+\bar{R}^{n}Z^{n}\bar{I}^{n} \quad (2)$$

where $R^n$ is the binary state of relay R at time $n$
$r^n$ is the binary state of relay $r$ at time $n$
$I^n$ is the binary state of the input to relays R and $r$ at time $n$
$Z^n$ is the binary state of relay Z at time $n$
$R^{n+1}$ is the binary state of relay R at time $n+1$
$r^{n+1}$ is the binary state of relay $r$ at time $n+1$, and $$G^{n+1}=\bar{g}^{n}(Z^{n}I^{n}+G^{n}\bar{I}^{n}) \quad (3)$$

$$g^{n+1}=g^{n}(Z^{n}+\bar{I}^{n})+\bar{G}^{n}Z^{n}I^{n} \quad (4)$$

with comparable notations employed for the G and $g$ relays as are given above for the R and $r$ relays.

Further, there are the following Boolean equations which relate to each unit:

$$A=I_{11}[\bar{I}_1(R_1+r_1)+I_1(G_1+g_1)+\bar{I}_2(R_2+r_2)+I_2(G_2+g_2) + \dots +\bar{I}_5(R_5+r_5)+I_5(G_5+g_5)] \quad (5)$$

where $R_1$ to $R_5$ are the binary relay states of the relays R for the five indicator positions $a$ to $e$, respectively with similar notations employed for relays $r$, $G$ and $g$.

In one exemplary operation of the circuit of FIGURES 4A, 4B and 4C, let it be assumed that each of the logic units of the equipment has a stored concept of $a$, $d$, $e=1$ and $c=0$ so that the units are operative as a four input AND gate providing a "yes" or "1" output in response to an input of "1" in positions A, D and E and an input of "0" in position C of input card 20, and a "no" output response to any other input. The input card 20 will accordingly have notches cut for positions B and C as shown in FIGURE 4A. It is noted that since position B is not part of the AND gate function it may be ignored. Insertion of the card 20 energizes relay coils $I_1$, $I_4$ and $I_5$ as well as relay coil $I_{11}$. Switch $I_{11}$1 closes and switches $I_1$1, $I_4$1 and $I_5$1 reverse their contact connections from the non-operated state shown in the drawing. Considering switch $I_1$1, conductor 45 is now open-circuited and conductor 50 is connected to ground through conductor 44. Since the proper concept is assumed to be stored, logic performing component 60–1 in unit 2 is in a condition for lighting the red lamp 74. Similarly, logic performing components 60'–1 and 60''–1 in units 3 and 4 are in a condition for lighting the red lamps therein.

Referring to the detailed schematic diagram of component 60–1 in unit 1, the normally operating relay coil R is in an energized condition, being held in this state through switch R4. Although switch R5 is now closed, relay coil A is not energized by this portion of the circuit since conductor 45 is open-circuited. Logic performing component 60–0 does not have either of its relay coils G or $g$ energized, and their associated switches G5 and $g$4 are in a normally open position. Thus, although conductor 50 is connected to ground, relay A cannot be energized due to the contribution of this portion of the circuit. This condition is also represented by the first two full terms in the Boolean Equation (5).

It may be readily appreciated that relays $I_4$ and $I_5$ which are also energized and are coupled to identical logic performing components as is relay $I_1$, effect the same operation as above described. Thus, logic performing circuit components 63–1 and 64–1 of unit 2, which are identical to component 60–1 have their relays R energized, but since the input conductors 48 and 49 coupled to components 63–1 and 64–1, respectively, are open-circuited, relay coil A cannot be energized due to their contribution. Further, components 63–0 and 64–0 which are identical to component 60–0, operate as described with respect to component 60–0 and, hence, cannot contribute to energizing coil A.

Relay $I_3$ is unenergized since a notch is cut out of the card in position C, the input information bit being "0." The contacts of switch $I_3$1 are in a non-operated condition, as shown in the drawing, conductor 47 being connected to ground and conductor 52 being open-circuited. Conductor 47 is seen to be coupled as the input to logic performing component 62–1, which is identical to component 60–1. In component 62–1 relay coils R and $r$ are de-energized since the stored concept is "green" in this position. Their associated switches R5 and $r$4 are therefore in a normally open condition so that relay coil A cannot be energized due to this portion of this circuit. Finally, open-circuited conductor 52 is coupled as the input to logic performing component 62–0 which has one of the relay coils G or $g$ energized. Normally, relay coil G will be energized. However, since conductor 52 is open-circuited, relay A is not energized due to this portion of the circuit. Thus, it is seen that relay A is not energized in response to any of the contributing logic performing components in unit 2. With relay coil A de-energized switch A2 in adaptive component 65 is open and no closed path exists for energizing relay coil Z.

Since relay coil Z is de-energized, a circuit is closed through Z5 for lighting the "yes" lamp 87.

It is noted that with the proper concept stored in units 3 and 4, identical operation to that above described occurs therein so that these units also provide a "yes" output response. The output responses are applied through the "yes, no" majority gate to output unit 5B and since the output responses are each the same, the output unit 5B also provides a "yes" response. With reference again to FIGURE 6, for a "yes" response in each of the logic units, the switch contacts for the "yes, no" majority gate are as shown in FIGURE 6. Accordingly, no path is provided for energizing relay coil Ƶ and the "yes" lamp 124 of output unit 5B is lit. From an inspection of FIGURE 6 it is seen that coil Ƶ also would not be energized for a "yes" response in two of the three logic units.

In a second exemplary embodiment of the operation of the circuit of FIGURES 4A, 4B and 4C, let it be assumed that there is a four input AND gate operation as with respect to the first example, there being the same stored concept as before, but that now the first input of card 20 is changed from a "1" to a "0" which properly requires a "no" response from the computer. Now with relay $I_1$ de-energized its associated switch $I_1$1 is in the non-operated condition as shown and conductor 45 is grounded. A closed circuit through relay switch R5 is now provided for energizing relay A. With relay A energized, switch A2 closes energizing relay Z and a correct "no" response is produced in unit 2 and similarly in units 3 and 4. In FIGURE 6, the contacts are all actuated to be in the reverse state from that pictured and a ready path is provided for energizing coil Ƶ to provide a "no" response.

In a third exemplary operation of the circuit, let it be assumed that the same input is provided as in the second example but that now only units 3 and 4 have the correct stored concept and that unit 2 has malfunctioned due, for example, to the malfunctioning of relay R of its logic performing component 60–1. In this malfunctioning condition the relay switches associated with relay coil R are in their normal de-energized condition as shown. Although conductor 45 is now connected to ground, because R5 is open, relay A is not energized due to this portion of the circuit as it should be. In addition, it may be recognized that relay A is not energized due to any contribution of component 60–0. Consequently, switch A2 is in its normally open state, relay coil Z is de-energized, a "yes" response is indicated, which is incorrect, and there is a YES/NO error.

Since it has been said that units 3 and 4 are operating correctly, the "yes, no" majority gate provides the correct "no" response in output unit 5B, its relay Ƶ being energized. As noted hereinbefore, each of the teach jacks 6‴, of output unit 5B is normally connected to the learn jacks of units 2, 3 and 4 for initiating a punish sequence in the adaptive circuit components of these units when required.

Considering now the circuitry of the adaptive circuit component 65 of unit 2, it has been said that the relay coil A of this unit is not energized so that relay switch A3 is in its normal position, as shown in the drawing. The relay switch Ƶ2 of the output unit is in its energized state, since its relay coil Ƶ is energized. A connection is made from ground in output unit 5B through Ƶ2 and conductor 127, through conductor 84 and A3 of unit 2 and through automatic-manual switch 8, now in the automatic position, for energizing relay coil O of unit 2. The following sequence of events now occurs as set forth in the timing diagram of FIGURE 5. After slight delay, relay coil P is energized through the now closed contacts of switch O2. Simultaneously, relay coil Q is energized through the now closed contacts of switch O3. Relay coil S is then energized through switches O3 and Q1. Next, relay T is energized through switches S1 and O4. Relay coil Z as yet has no path for providing energization thereof.

Referring now to malfunctioning logic performing unit 60–1, it has been noted that relay $I_1$ is de-energized and that conductor 45, providing the input thereto, is grounded. Accordingly, a closed path is provided from ground through conductor 45, through the now closed contacts of switch T1, through the normally closed contacts of switch Z1, through diode 69–1, and through relay coil *r* to source $-V_1$. Thus, relay coil *r* is now properly energized, which closes switch *r*4 and provides energization of relay coil A, shown by the YES/NO case in FIGURE 5. Referring again to adaptive circuit 65, relay switch A3 changes its contact state so that the ground connection through A3 and Ƶ2 for relay coil O is broken. Thus, relay O releases. Next, relays P and T release simultaneously because O3 and O4 open. Following, relay S releases because T2 opens and then relay Q releases because S1 opens. Simultaneous with relay Q releasing, relay coil Z is energized through a path from ground through the normally closed contacts of switch T2 and through switches S2 and A2.

That portion of the stored concept in position *a* is now correct. However, in accordance with Rule 1 which for YES/NO errors dictates that, in response to a punish signal, all lights go on that disagree with the corresponding input, that portion of the stored concept in positions *b, c, d* and *e* has now changed. The red light has been turned on in positions *b* and *c* and the green light turned on in positions *d* and *e*. This has occurred as follows, referring, for example, to position *c*. The proper concept has been said to be green for position *c*. Thus, before the punish signal was applied one of the relays G or *g* in logic performing component 62–0 was energized. Since the input conductor 52 to component 62–0 is open-circuited, the closing of the T1–0 switch in component 62–0 does not affect the operation of this portion of the circuit, and the green light remains on. However, input conductor 47 to logic performing component 62–1 is connected to ground and the closing of switch T1–1 of component 62–1 completes the circuit for relays R and *r* so that in the normal condition relay R becomes energized and the red light turns on.

If now it is assumed that a subsequent input is applied that is the same as given in the first exemplary operation, namely, $A, D, E=1$ and $C=0$, then in accordance with Rule 2 the incorrect lights will be turned off in positions *b, c, d* and *e*, and the proper concept will be restored.

Accordingly, with the indicated input applied, the relay coil A in unit 2 is energized by being connected to ground through a closed path provided by each of conductors 46, 47, 53 and 54, any one of these paths actually being sufficient. As a result, switch A2 is closed and relay Z is energized providing a "no" response. Since this response is incorrect, there occurs a YES/NO error.

A punish sequence in adaptive circuit 65 is initiated and proceeds similarly to that described previously. Thus, relay coil O is energized. Next, relays P and Q are simultaneously energized. Following, relay S is energized and then relay T becomes energized. Relay Z remains energized through switches Z3 and Q2.

A shunt path is provided in components 61–1, 62–1, 63–0 and 64–0 for de-energizing the relays in these components. For example, in component 62–1 input conductor 47 is grounded through switch $I_3$1 and with switch T1–1 of this component now closed and Z1–1 in the energized state, a shunt path around relay coils R and *r* de-energizes these relays. The ground connection for relay coil A through conductor 47 is thus broken. Similarly, the ground connections for coil A through conductors 46, 53 and 54 are broken and coil A becomes de-energized, shown by the NO/YES case in FIGURE 5. Referring again to adaptive circuit component 65, with switch A3 in now its normal condition, coil O is de-energized. In turn, relays P and T are simultaneously de-energized. Following, relay S releases and then relay Q releases. Finally, relay Z is de-energized, the stored concept is now correct and unit 2 is functioning properly.

It may be recognized from the above exemplary modes of operation that should more than one of the normally operating switch R and G of logic performing components of the units 2, 3 and 4 malfunction, the corresponding standby components *r* and *g*, so long as they are capable of proper operation, will be switched into the logic performing circuit to provide proper operation in the various units in accordance with the above described operation.

Further, similar to the operation presented above, a unit which is introduced into the overall equipment without having the proper stored concept, may be readily adapted to provide the proper stored concept.

Only a single standby relay is illustrated in each of the logic performing components of FIGURE 4B. It should be understood, however, that the order of redundancy at the second level may be readily extended by the use of additional standby component parts. In FIGURE 7 there is illustrated the circuitry of a logic performing component for use in logic units 2, 3 and 4, having a normally operating relay and two standby relays. By way of example, a read logic performing component is illustrated comparable to component 60–1 of FIGURE 4B, where an additional standby relay $\rho$ is introduced into the circuit together with relays R and *r*. The Boolean equations from which the illustrated circuit is derived are as follows:

$$R^{n+1}=\bar{r}^n\bar{\rho}^n(Z^n\bar{I}^n+R^nI^n) \quad (6)$$

$$r^{n+1}=\bar{\rho}^n(Z^n\bar{I}^n+r^nI^n) \quad (7)$$

$$\rho^{n+1}=\rho^n(Z^n+I^n)+\bar{R}^n\bar{r}^nZ^n\bar{I}^n \quad (8)$$

The circuit for a green logic performing component with two standby relays will be understood to be comparable to that given with respect to FIGURE 7 and need not be specifically presented. The equations are comparable, with only I and $\bar{I}$ being interchanged in addition to a different relay designation.

Referring now to FIGURE 7, relay coil $\rho$ is connected between source $-V_1$ and ground by a resistor 150 and its normally open switch contacts $\rho_1$. Input conductor 151 is coupled through switch contacts T1, Z1 and diodes 167, 171, 172 and 169 to relay coils R and *r* in a manner similar to that shown with respect to corresponding elements in component 60–1. With respect to relay coils R and *r*, the circuit is modified from that of component 60–1 to include a normally open single pole, single throw switch $\rho_2$ in parallel with switch *r*1, and the serial connection of a normally closed single pole, single throw switch *r*5 and a normally open single pole, single throw switch $\rho_3$ in parallel with switch R2.

The normally open contacts of switch Z1, in addition to being connected to diodes 171 and 172, are also connected through diode 152 to the high potential side of relay coil $\rho$ for shunting down said coil. The normally closed contacts of switch Z1, in addition to being connected to diodes 167 and 169, are also connected through diode 153 to the grounded side of relay coil $\rho$. In parallel with relay coil $\rho$ are normally open single pole, single throw switches R6 and *r*6. In addition, a normally open single pole, single throw switch $\rho_4$ is connected in parallel with switchs R3 and *r*2 which are associated with lamp 154. Normally open switch $\rho_5$ is connected in parallel with switches R5 and *r*4 which are intended to be coupled through diode 176 to a relay coil A.

The operation of the circuit of FIGURE 7 is comparable to that described with respect to the logic performing components of FIGURE 4B. Now (however, if relays R and *r* should fail, relay $\rho$ is available to be inserted into the circuit to maintain continuous operation of the component.

It may be appreciated that any number of standby component parts may be employed in accordance with principles above set forth. The general Boolean equations for any plurality of standby component parts in the red logic performing components are as follows:

$$K_A^{n+1}=\bar{K}_B^n\bar{K}_C^n\ \ldots\ \bar{K}_Z^n(Z^n\bar{I}^n+K_A^nI^n) \quad (9)$$

$$K_B^{n+1}=\bar{K}_C^n\ \ldots\ \bar{K}_Z^n(Z^n\bar{I}^n+K_B^nI^n) \quad (10)$$

$$K_Y^{n+1}=\bar{K}_Z^n(Z^n\bar{I}^n+K_Y^nI^n) \quad (11)$$

$$K_Z^{n+1}=K_Z^n(Z^n+I^n)+\bar{K}_A^n\bar{K}_B^n\ \ldots\ \bar{K}_Y^nZ^n\bar{I}^n \quad (12)$$

where $K_A$ represents the normally operating relay and $K_B$ to $K_Z$ the standby relays.

The corresponding equations for green logic performing components are similar except that I and $\bar{I}$ are interchanged.

It may be further noted that, in accordance with the principles of the invention, the logic performing components can be constructed to have a plurality of standby component parts arranged to be introduced into the circuit operation in the presence of either an open or a short type failure. For example, a circuit having two standby relays can be derived from the following equations:

$$K_A^{n+1}=K_A^n(Z^n+I^n)+(\bar{K}_B^n+\bar{K}_C^n)Z^n\bar{I}^n \quad (13)$$

$$K_B^{n+1}=K_B^n(Z^n+I^n)+(\bar{K}_A^n+\bar{K}_C^n)Z^n\bar{I}^n \quad (14)$$

$$K_C^{n+1}=K_C^n(Z^n+I^n)+(\bar{K}_A^n+\bar{K}_B^n)Z^n\bar{I}^n \quad (15)$$

where $K_A$ represents the normally operating relay and $K_B$ and $K_C$ the standby relays.

The invention has been described in detail with respect to a specific operable embodiment thereof for the purpose of providing a full and complete disclosure. It is not intended, however, that the detailed disclosure be limiting of the basic invention herein taught, and numerous modifications may be made to the structure described by those skilled in the art which would not exceed the invention. For example, solid state switching devices may be readily employed for the mechanical switches that are indicated.

Further, other than performing simple and complex logical operations it may be noted that equipment of the type described can be readily employed for binary pattern detection useful for recognizing various types of information displays such as photographs, printed documents, etc.

In addition, although red and green light information bits have been employed in each position of the stored concept for adding flexibility to the equipment and to provide a more ready demonstration of the equipment functioning, for computer type operations each indicator position may be represented by a single light in either an on or off condition, with minor modification of the circuitry. The result of such modification would appreciably reduce the number of logic performing component parts that are required.

The appended claims are intended to include all modifications falling within the true scope and spirit of the invention.

What we claim as new and desire to secure by Letters Patent of the United States is:

1. Electrical logic circuitry which employs redundancy in combination with adaptation for extending its period of continuous operation, comprising:

(a) a logic unit characterized by an ability to adapt itself to perform a logical operation in response to external stimuli, said stimuli being applied upon said unit generating an incorrect output, (b) said logic unit including at least two sets of corresponding logic performing component parts of similar characteristics, (c) means for coupling corresponding component parts in parallel arrangement so that for each parallel arrangement only a single part is in an operative condition at any one time and the remaining parts are in a standby state, (d) adaptive means for adjusting said logic performing component parts in response to a succession of applied inputs and said external stimuli to generate a correct output for a given input each time a stimulus is applied, said adjustment continuing until a correct output is generated for any input, said adaptive means including (e) further means for replacing a previously operating component part which has failed with a corresponding standby part.

2. Electrical circuitry as in claim 1 wherein said logic unit includes a parallel arrangement of corresponding logic performing component parts for each input variable of the applied input.

3. Electrical circuitry as in claim 2 wherein the number of corresponding logic performing component parts in each parallel arrangement is greater than two.

4. Electrical logic circuitry which employs redundancy in combination with adaptation for extending its period of continuous operation, comprising:

(a) at least three logic units each characterized by an ability to adapt itself to perform a logical operation in response to applied external stimuli, (b) means for connecting and operating said units in parallel, (c) each unit including at least two sets of corresponding logic performing component parts of similar characteristics, (d) means for coupling corresponding component parts in parallel arrangements so that for each parallel arrangement only a single part is in an operative condition at any one time, the remaining parts being in a standby state, (e) a majority gate responsive to the output of each of said logic units for providing a final output in accordance with the majority of the unit outputs, said external stimuli being derived from said final output, (f) means included in each said logic unit responsive to an input applied to said logic units and to said external stimuli for causing an individual one of said parts in the standby state to become operative upon the failure of a corresponding previously operative part.

5. Electrical circuitry as in claim 4 wherein said means included in each said logic unit further includes means for comparing the output of each logic unit with said final output so as to apply said external stimuli to a particular logic unit when the output of said particular logic unit and said final output are not in proper agreement.

6. Electrical circuitry as in claim 4 wherein each logic unit includes a parallel arrangement of corresponding logic performing component parts for each input variable of the applied input.

7. Electrical circuitry as in claim 6 wherein the number of corresponding logic performing component parts in each parallel arrangement is greater than two.

References Cited

UNITED STATES PATENTS 3,201,701 8/1965 Maitra ---------- 340—146.1 X

OTHER REFERENCES

Chao et al., "Duplexing Mobidic Computers," Automatic Control, December 1959, pp. 46–57.

MALCOLM A. MORRISON, *Primary Examiner.*

M. J. SPIVAK, *Assistant Examiner.*